Feb. 17, 1931.  D. D. MYERS  1,792,754
LIQUID LEVEL INDICATOR
Original Filed Sept. 9, 1920   2 Sheets-Sheet 1
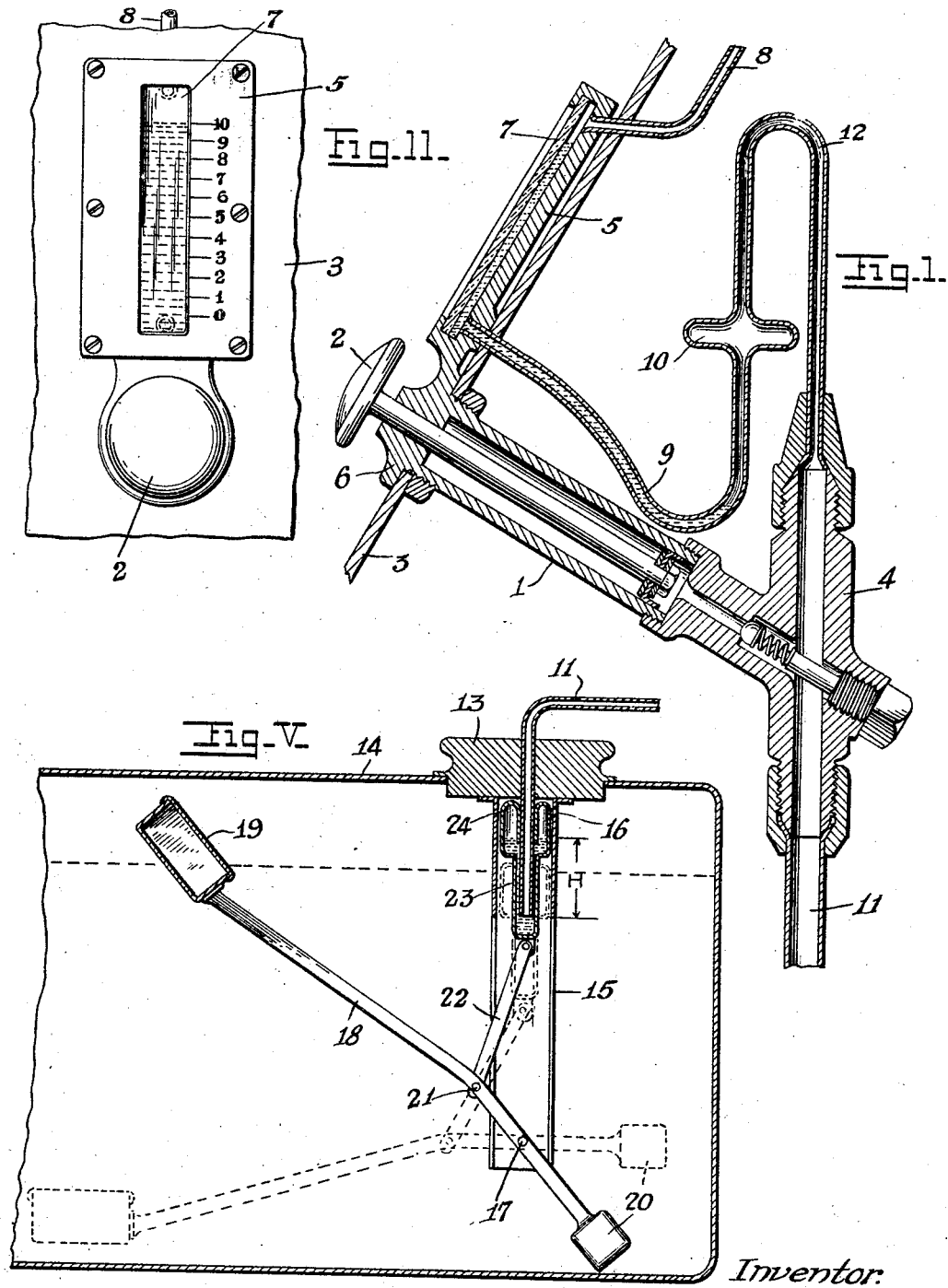
Inventor:
Don D. Myers
Chester H Braselton
Attorney Feb. 17, 1931.　　　　D. D. MYERS　　　　1,792,754
LIQUID LEVEL INDICATOR
Original Filed Sept. 9, 1920　　2 Sheets-Sheet 2
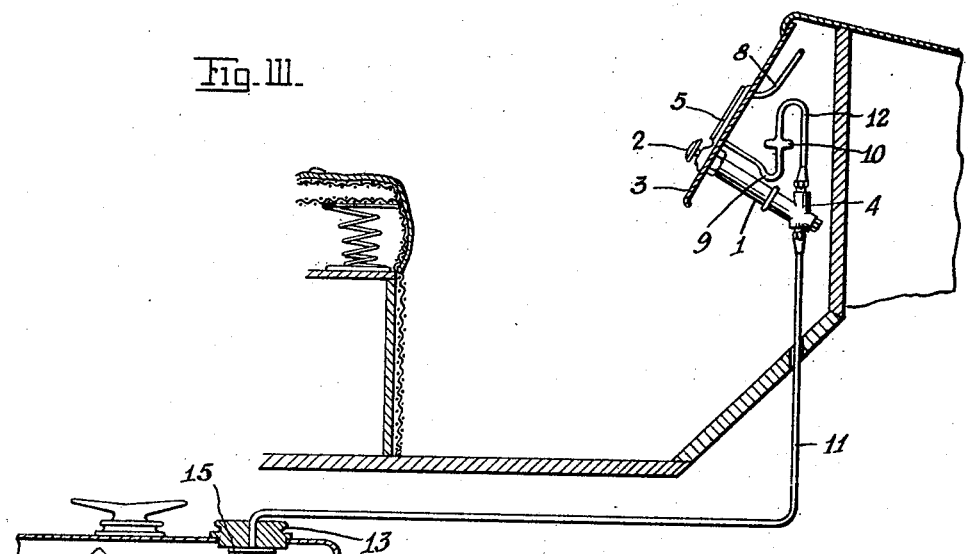
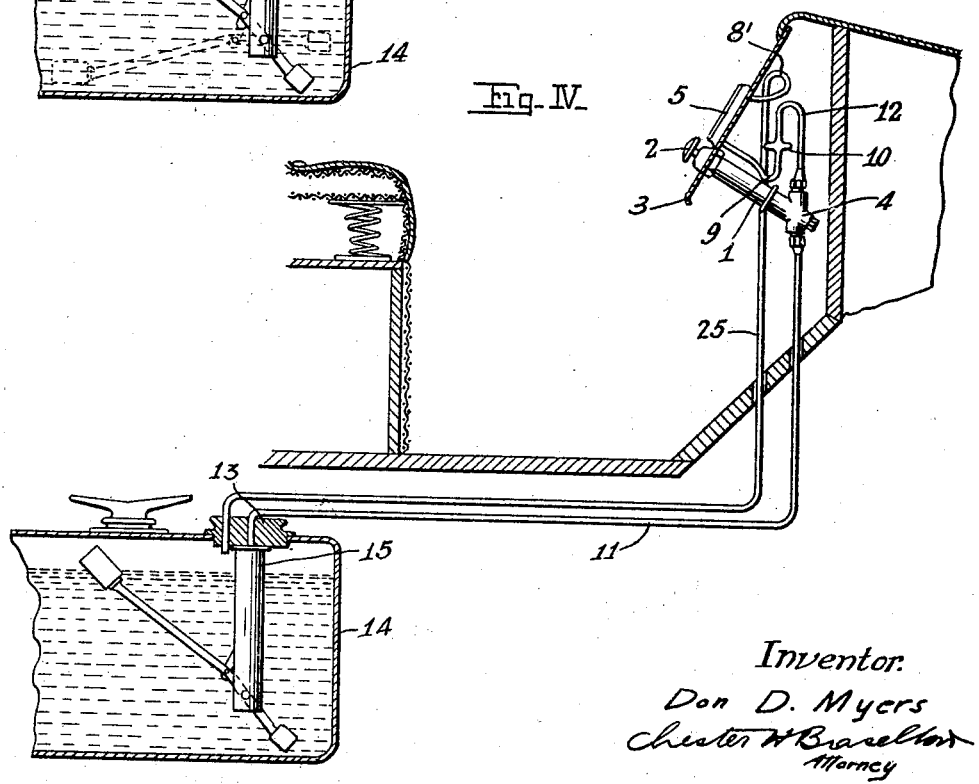
Inventor.
Don D. Myers Patented Feb. 17, 1931

1,792,754

UNITED STATES PATENT OFFICE

DON D. MYERS, OF TOLEDO, OHIO, ASSIGNOR, BY MESNE ASSIGNMENTS, TO THE TILLOTSON MANUFACTURING COMPANY, OF TOLEDO, OHIO, A CORPORATION OF DELAWARE

LIQUID-LEVEL INDICATOR

Application filed September 9, 1920, Serial No. 409,075. Renewed August 15, 1928.

This invention relates generally to measuring devices for determining the amount of liquid within a tank at a distant point.

The primary object of the invention is to provide means for indicating on the dashboard of an automobile or motor vehicle, the amount of fuel contained in the tank which is usually disposed at some distant point or concealed from the operator of the vehicle.

Another object is to provide a device of this character which has a relatively large pressure variation and hence can be easily indicated on the dash for only a small variation of the liquid level in the tank.

Other and further objects will appear as I proceed with a detailed description of that particular embodiment of the invention which for the purposes of illustration I have shown in the accompanying drawings in which, Figure I is a vertical section showing the arrangement of the airpump and level indicator.

Figure II is a view of the pump and indicator from the operator's seat.

Figure III is a diagrammatic view of the arrangement with the fuel tank.

Figure IV is a similar view to Figure III but with a pressure fuel feed system.

Figure V shows on a larger scale the float mechanism within the tank.

Referring to the drawings, 1 represents the air pump which is shown as mounted upon the cowl or dash 3 of a motor vehicle, with its plunger 2 extended through the dash within easy reach of the operator. The level indicator 5 is mounted upon the dash and is shown as formed integrally with the cylinder head 6 of the air pump, and has a glass front 7 securely fixed therein. In the modifications of Figures I and III the vent tube 8 above the mercury level in the indicator opens to the atmosphere. The U-tube 9 is filled with mercury and when atmospheric pressure prevails in the pipe 11 the mercury rises into the expanded portion 10 of the pipe 9 which is on a level with the lower part of the indicator scale. The pipe 9 connects by an upward bend 12 to the air pressure pipe 11. Any form of air pump and connection to pipe 11 may be used, but I have shown the pump cylinder, pipe 12, and pipe 11 connected by an integral casting 4 as clearly shown in Figure I. The lower end of pipe 11 leads down into fuel tank 14 through the cap 13. On the bottom of the cap 13 is fixed the guide member 15, which preferably is a cylindrical pipe with vent holes 16 at the top. Pivoted at 17 at the lower end of member 15 is the float lever 18 having a float 19 at one end and counter weight 20 at the other. Pivoted at 21 upon the lever 18 is the link 22. The other end of link 22 is pivoted to the mercury cup 23 which travels in the guide 15 as the float 19 moves up and down on the fuel surface. The end of tube 11 extends down into the mercury to such an extent that it is below the mercury surface when cup 23 is at its lowest position, that is, when the float 19 is in the dotted position of Figure V. The upper end of the cup 23 is closed by the walls being curved over as shown, thus preventing the mercury being splashed out and also forming a guide for the pipe 11. Vent holes 24 are provided in the top of cup 23.

In the operation of this device, whenever it is desired to determine the level of fuel in the tank, the air pump 1 is operated thus forcing air into pipe 11 until it bubbles out at the bottom of pipe 11 through the mercury in cup 23. The distance H which the pipe 11 extends below the surface of mercury therefore determines the amount of air pressure which can be had in pipe 11. This pressure likewise acts on the mercury in the U-tube 9 and thus raises the level within the indicator 5. The head H varies with different positions of the cup 23, and therefore the pressure within pipe 11 varies with the fuel level in tank 14. Therefore the indicator scale may be calibrated so that the fuel level in tank 14 or the actual number of gallons in tank 14 may be read directly upon it.

Figure IV diagrammatically illustrates the arrangement when the fuel in tank 14 is under pressure, as when a pressure feed system is used. In this case the vent pipe 8' from the space above the mercury in the indicator is led back to the fuel tank through pipe 25. Therefore the same pressure exists at all times upon the surface of mercury in cup 23 and in the indicator 5.

I am aware that pressure indicators are known which have a pressure pipe submerged under the liquid level in a tank. The device of this invention increases the variation of the pressure to be measured and hence the accuracy of the measurement by immersing the pressure pipe in mercury instead of some lighter liquid as gasoline, which is only one-sixteenth as heavy as mercury.

While I have illustrated and described my invention in more or less detail and as embodied in certain forms it is obvious to those skilled in the art that the same is capable of considerable variation without departing from the scope of my invention as defined by the appended claims.

I claim as my invention:

1. In combination a liquid holding tank, a pressure pipe having a movable end closure, a pressure indicator for indicating the pressure within said pipe, means for varying the pressure in said pipe in accordance with the variation of the liquid level in said tank, said means including a liquid container in the tank into which said pressure pipe is inserted, and float operated means for varying the depth of insertion of said pipe as the level in the tank varies.

2. In a liquid level indicator system, the combination of a pressure indicator comprising a tube adapted to contain a liquid column; means responsive to the level of the liquid to be measured for varying the head of said liquid column; a pressure pipe connecting said pressure indicator and said means; and a pumping mechanism for varying the pressure in said pipe.

3. In a liquid level indicator, a pressure pipe, a pressure indicator connected thereto, a mechanical pumping mechanism for varying the pressure in said pipe according to the head of a relatively heavy liquid and means for varying the head of said heavy liquid according to the level of the liquid to be measured.

4. In a liquid level indicator system, the combination of a pressure indicator; a container containing a liquid, the level of which is to be determined; a pipe line connecting said indicator and container; a second liquid in said pipe line having a density greater than that of said first-named liquid; pump actuated means for varying the level of said second liquid in accordance with the variation of the level of the first liquid; and float actuated means for establishing a definite pressure in said pipe line corresponding to the level of liquid to be measured whereby said pressure indicator is operated.

5. In a liquid level indicating system, the combination of a pressure indicator; a container containing a liquid the level of which is to be measured; a pipe line connecting the indicator and container; a receptacle in said pipe line adapted to contain a second liquid, the density of which varies from that of said first liquid, the end of the pipe forming said pipe line being adapted to be submerged in said second liquid; means for varying the level of the second liquid in accordance with the variation of level of the first liquid; and pumping mechanism adapted to establish a definite pressure in the pipe line in accordance with the variation of the pressure head of the liquid level to be measured.

6. In a liquid level indicating system, the combination of a pressure indicator; a container containing a liquid level of which is to be measured; a pipe line connecting the indicator and container; a receptacle in said pipe line adapted to contain a second liquid, the density of which varies from that of said first liquid, the end of the pipe forming said pipe line being adapted to be submerged in said second liquid; means for varying the level of the second liquid in accordance with the variation of level of the first liquid; and means dependent on the head of the second liquid in said receptacle for establishing an indication of the level of the first liquid in the pressure indicator.

7. In a liquid level indicator, a pressure pipe; a pressure indicator connected thereto; a mechanism for varying the pressure in said pipe according to the head of a relatively heavy liquid and means for varying the head of said heavy liquid according to the level of the liquid to be measured.

In testimony whereof, I affix my signature.

DON D. MYERS.